United States Patent
Frederiksen

(10) Patent No.: US 9,684,704 B2
(45) Date of Patent: *Jun. 20, 2017

(54) DATA EXTRACTION AND SPARSENESS DISCOVERY FROM MULTIDIMENSIONAL DATABASES

(71) Applicant: International Business Machines Corporation, Armonk, NY (US)

(72) Inventor: Steffen Zacho Frederiksen, Mill Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/731,005

(22) Filed: Jun. 4, 2015

(65) Prior Publication Data

US 2015/0269240 A1 Sep. 24, 2015

Related U.S. Application Data

(63) Continuation of application No. 13/711,344, filed on Dec. 11, 2012, now Pat. No. 9,087,116.

(60) Provisional application No. 61/576,931, filed on Dec. 16, 2011.

(51) Int. Cl.
*G06F 17/30* (2006.01)

(52) U.S. Cl.
CPC .. *G06F 17/30592* (2013.01); *G06F 17/30333* (2013.01); *G06F 17/30563* (2013.01)

(58) Field of Classification Search
CPC ... G06F 17/30592; G06Q 10/10; G06Q 10/06

USPC .................................................. 707/603, 758
See application file for complete search history.

(56) References Cited

U.S. PATENT DOCUMENTS

| | | | |
|---|---|---|---|
| 8,463,745 B2 | 6/2013 | Grosset et al. | |
| 8,868,544 B2 | 10/2014 | Witkowski et al. | |
| 2005/0010565 A1 | 1/2005 | Cushing et al. | |
| 2005/0038799 A1* | 2/2005 | Jordan | G06F 17/30592 |
| 2008/0288525 A1* | 11/2008 | Leikucs | G06F 17/30286 |
| 2009/0089306 A1 | 4/2009 | Bhattacharjee et al. | |
| 2010/0169268 A1 | 7/2010 | John et al. | |
| 2011/0179051 A1* | 7/2011 | Bruckner | G06Q 10/00 707/758 |

OTHER PUBLICATIONS

Prosecution History from U.S. Appl. No. 13/711,344, from Jul. 18, 2014 through Mar. 10, 2015, 63 pp.

* cited by examiner

*Primary Examiner* — Jeffrey A Burke
*Assistant Examiner* — Thong Vu
(74) *Attorney, Agent, or Firm* — Shumaker & Sieffert, P.A.

(57) ABSTRACT

Techniques for a method for efficiently extracting data from multidimensional databases are disclosed herein. When extracting data from a subset of a multidimensional database, the method first extracts data from high-level cells within the subset. If there are any empty high-level cells, the method removes lower-level cells that roll-up into the empty high-level cell, without extracting data from these lower-level cells. The method improves the data extraction efficiency by reducing the overhead of extracting data from empty cells of multidimensional databases.

17 Claims, 8 Drawing Sheets

| Dimension Name | Number of Dimension Members |
|---|---|
| Years | 8 |
| Scenario | 20 |
| Product | 108 |
| Legal Entity | 149 |
| Cost Center | 2758 |
| Account | 512 |
| Period | 12 |

*FIG. 2*

| Dimension | Subset Member Names | SubsetMember Count | Subset Top Members | Subset Top Members Count |
|---|---|---|---|---|
| Market | East, New York, New York City, Albany, Massachusetts, Boston | 6 | East | 1 |
| Product | Regular Cola | 1 | Regular Cola | 1 |
| Sales Time | Sales Time, First Quarter, January, February, March, Second Quarter, April, May, June, Third Quarter, July, August, September, Fourth Quarter, October, November, December | 17 | Sales Time | 1 |

*FIG. 3*

DATA EXTRACTION AND SPARSENESS DISCOVERY FROM MULTIDIMENSIONAL DATABASES

PRIORITY CLAIM

This application is a continuation of U.S. application Ser. No. 13/711,344, filed on Dec. 11, 2012, entitled "DATA EXTRACTION AND SPARSENESS DISCOVERY FROM MULTIDIMENSIONAL DATABASES", which claims the benefit of U.S. Provisional Patent Application Ser. No. 61/576,931, entitled "SPARSE DISCOVERY", which was filed on Dec. 16, 2011. Both of these applications are incorporated by reference herein in their entirety.

FIELD OF THE INVENTION

At least one embodiment of the present invention pertains to multidimensional databases, and more particularly, to the efficient extraction of data and metadata from multidimensional databases.

BACKGROUND

Multidimensional databases are generally superior to traditional relational database management systems in terms of speed, size, and manageability. Conceptually in multidimensional database systems, data is represented as cubes with a plurality of dimensions, rather than relational tables with rows and columns. A cube includes groups of data that are located at three or more dimensions. Dimensions are cube attributes used to locate and organize the data in the cube. Each dimension has a hierarchy of levels of dimension members. Data in the cube can be aggregated based on the hierarchy. Accordingly, data can be viewed at different levels of details. The multidimensional model is optimized to handle large amounts of data. In particular, it allows users to execute complex queries on data cubes for analyzing business information.

As the global business climate becomes ever more competitive, survival in the marketplace requires timely and precise business decisions based on accurate and up-to-date information. Data analysis, reporting, and database query software provide business users with the tools to process the ever-growing mountain of data. Business intelligence (BI) is the name given to the broad category of applications and technologies for helping business users make better decisions. BI applications include decision support systems, query and reporting, online analytical processing (OLAP), statistical analysis, forecasting, and data mining. For decision support and OLAP applications, multidimensional databases offer improvements over conventional relational databases in calculation performance, trend analysis/modeling, business modeling capabilities, and the management of sparse data sets. The structure of a multidimensional database is superior to a relational database for these applications because the sophisticated aggregation paths, calculations, and write-back capabilities can help model, more effectively, the business entities and relationships among entities that make up a company's operations. For example, companies usually organize products by lines or families, customers by regions or distribution channels, and employees by divisions and regions. Analysts use these structures which are naturally implemented in multidimensional databases to navigate the data in an intuitive manner. Multidimensional databases are so commonly used for OLAP applications that OLAP is almost synonymous with multidimensional databases.

Users of sophisticated BI systems may wish to extract data from one database, perform transformations of the extracted data, and load the transformed data into another database. This process (referred to as "ETL"—Extraction, Transformation, and Loading) allows for the consolidation of data into a centralized data warehouse. This consolidated data may be used with one of the many database analysis, data mining, reporting and visualization tools. Businesses typically manage their data warehouse using relational database management systems. Many business intelligence reporting, analysis, and visualization applications are designed to run on data from this type of relational database. Relational database technology differs from multidimensional data stores. Users wishing to employ relational database reporting, analysis, and visualization tools with data originating from a multidimensional database require that the data and metadata (i.e. the descriptive information about the data contained in the database) be extracted from the multidimensional database. For instance, ETL is commonly performed by extracting data from a source multidimensional database, and by supplying the extracted data to a destination database that is optimized to support analysis and reporting, typically a conventional relational database.

SUMMARY

Techniques introduced here provide a fast and efficient process of extracting data from multidimensional databases by excluding empty cells from the extraction process. Multidimensional databases are typically sparsely populated, which means only a small fraction of cells have data values. Inefficient data extraction from such a multidimensional database can result from the overhead of extracting data from a large amount of empty cells. When extracting data from a subset of a multidimensional database, the method first extracts high-level cells within the subset. If there are any empty high-level cells, the method determines, from the subset, a reduced subset of the original subset by excluding the lower-level cells that roll up into the empty high-level cells form the reduced subset. The method continues the extraction process on the reduced subset without extracting these excluded lower-level cells. Lower level cells are said to roll up into a higher level cell when their data values contribute to the data value of the higher level cell. In this way, the extraction process avoids unnecessarily spending time on extracting the empty lower-level cells from the multidimensional databases.

In accordance with the techniques introduced here, therefore, a method of extracting data from a multidimensional database is provided. The method first receives a request to extract data from a subset of the multidimensional database that stores data at a plurality of cells. The subset is defined by a plurality of dimension members. Each dimension member of the plurality of dimension members belongs to a dimension of a plurality of dimensions of the multidimensional database. Then the method identifies top-level members from the plurality of dimension members, wherein the top-level members of a dimension are the lowest level members of that dimension of the multidimensional database wherein the members of that dimension of the subset roll up into. The method further determines high-level cells within the subset, wherein each of the high-level cells is located by a dimension member of the subset and a group of top-level members. For each individual high-level cell of the high-level cells, the method extracts a data value from that individual high-level cell, and if that individual high-level cell has no data value, determines, form the subset, a reduced subset by excluding the dimension member of the high-level cell from the reduced subset. The method satisfies the request by extracting data values from the reduced subset without extracting data values from the removed cells.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 2 illustrates an example of a dimension list of a multidimensional database;

FIG. 3 illustrates an example of a list of dimension members and root members of a multidimensional database;

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

A multidimensional database is a database organized as cubes (or hypercubes having more than three dimensions) having a set of dimensions that provide a reference to each data cell (also referred as intersection point) within the cube. In a multidimensional database, each dimension is formed by a tree structure of nodes called dimension members, or simply "members", which may be organized in a hierarchy or hierarchies of levels. Dimensions are analogous to Cartesian coordinates or basis vectors in mathematics in that a data cell (or intersection point) may be referenced by selecting a member for each of the dimensions and using the "intersection" of the selected members to identify or index the data value of the cell. In other words, each cell in the multidimensional database can be located by dimension members of the multiple dimensions. In a dimension hierarchy, each level of the hierarchy may represent a degree of detail or granularity of the data. A hierarchy provides an intuitive way to consolidate, aggregate, calculate and navigate across the dimension. Typically, sets of members are grouped at each level of the hierarchy because of similar attributes of the members.

Figure 1A:
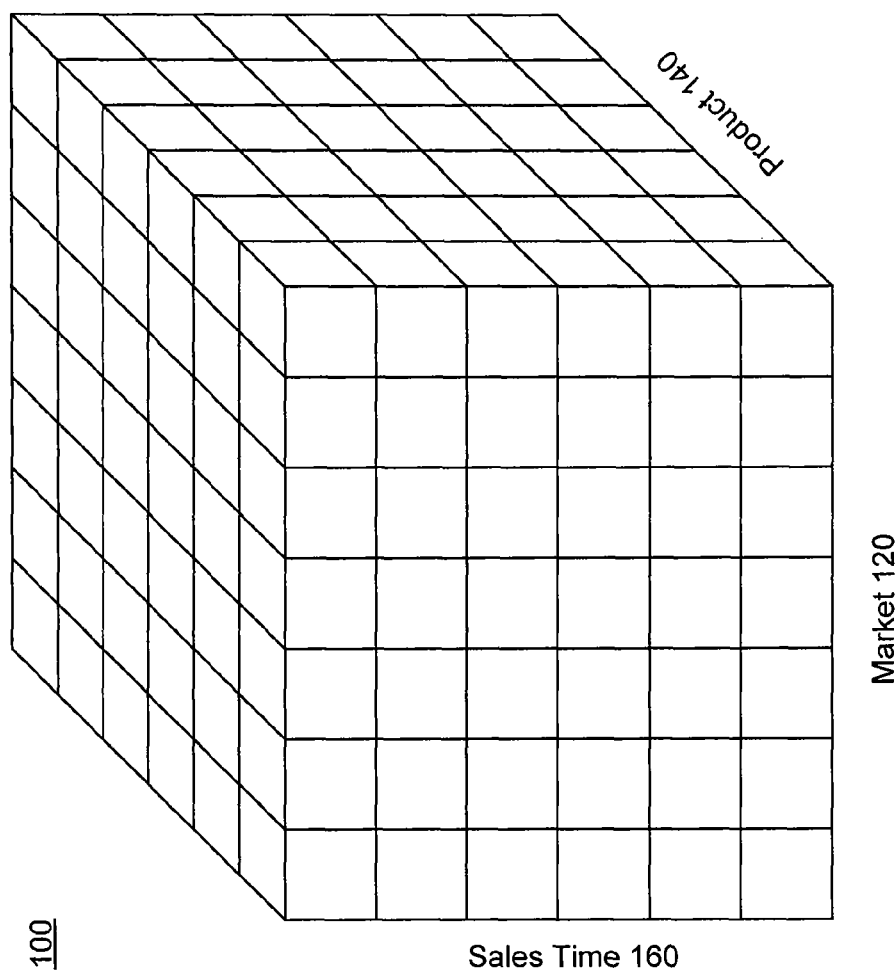
FIG. 1A illustrates an example of a multidimensional database.

FIG. 1A shows an exemplary multidimensional database 100 that may represent, for example, the sales figures for a corporation. In this example, there are three dimensions shown. Although a three-dimensional cube is used for this example because it is easily shown in a visual illustration, "cubes" of any number of dimensions may be used to represent multidimensional databases having more than three dimensions. In FIG. 1A, the three dimensions are market (i.e. geographic location) 120, product 140, and sales time 160. Each dimension can have a hierarchy with one or more levels.

Figure 1B:
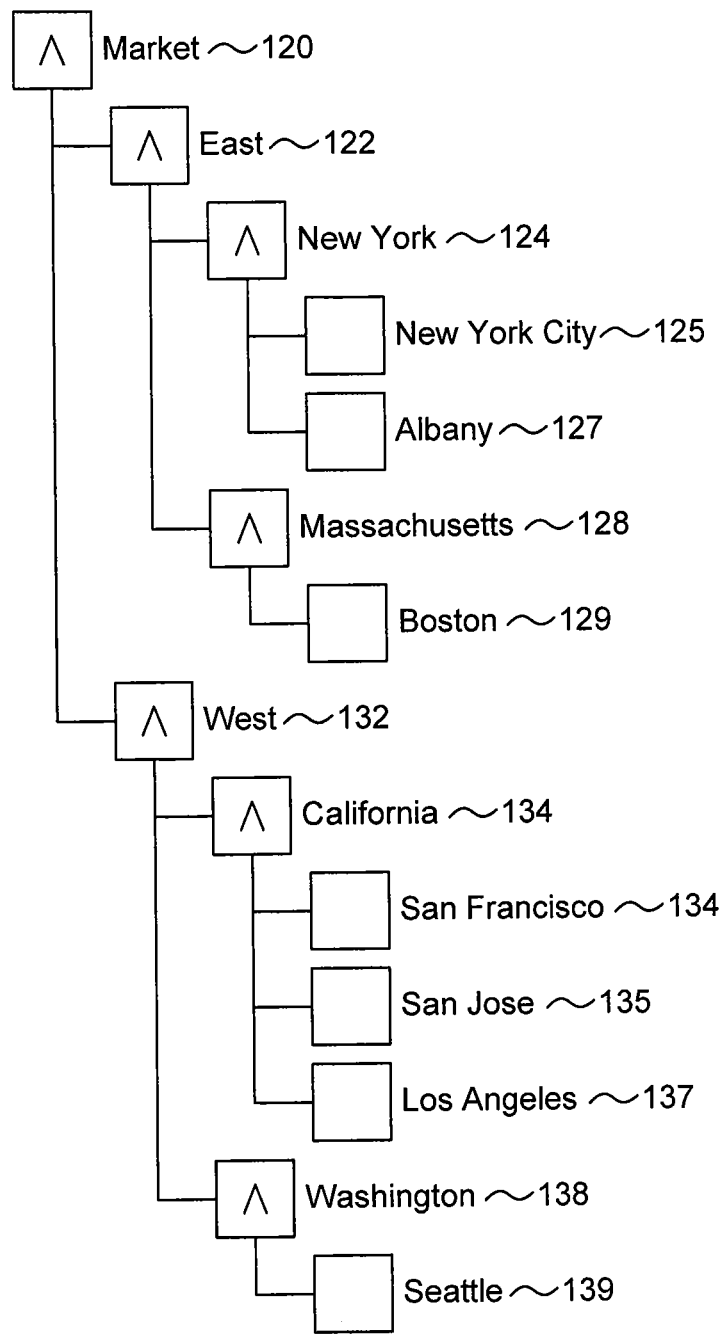
FIG. 1B illustrates an example of a hierarchy outline representing a market dimension of a multidimensional database.

Dimension hierarchies reflect information about how the dimension members in a dimension are related to each other. Members are structured above, at the same level of, or below other members. FIG. 1B shows an example of a hierarchy of the market dimension 120 of the multidimensional database 100. The market dimension 120 has three levels of hierarchy: region, state, and city. At the region level, there are two dimension members: East 122, West 132. The dimension member East 122 is also a parent member that has a branch below it. East 122 has two child dimension members: New York 124 and Massachusetts 128. A child dimension member is a dimension member that has a parent above it. New York 124 and Massachusetts 128 are sibling members. Sibling members are child members of the same immediate parent member. The member New York 124 has two child members: New York City 125 and Albany 127. The member Massachusetts 128 has one child member: Boston 129.

Descendant members are dimension members in branches below a parent. Descendent members of a dimension member include the child member(s) of the dimension member. For example, as shown in FIG. 1B, members New York 124, New York City 125, Albany 127, Massachusetts 128 and Boston 129 are descendant members of East 122. Ancestor members are dimension members in branches above a dimension member. Ancestor members of a dimension member include the parent member of the dimension member. For example, as shown in FIG. 1B, members East 122 and New York 124 are ancestor members of member New York City 125.

Similarly, member West 132 has two child members: California 134 and Washington 138. Member California 134 has three child members: San Francisco 133, San Jose 135 and Los Angeles 137. Member Washington 138 has one child member: Seattle 139. In this case, these dimension members representing cities are leaf level members. Leaf level members (also referred to as level zero members) are dimension members which have no child member. For example, as shown in FIG. 1B, members New York City 125, Albany 127, Boston 129, San Francisco 133, San Jose 135, Los Angeles 137 and Seattle 139 are leaf level members.

Figure 1C:
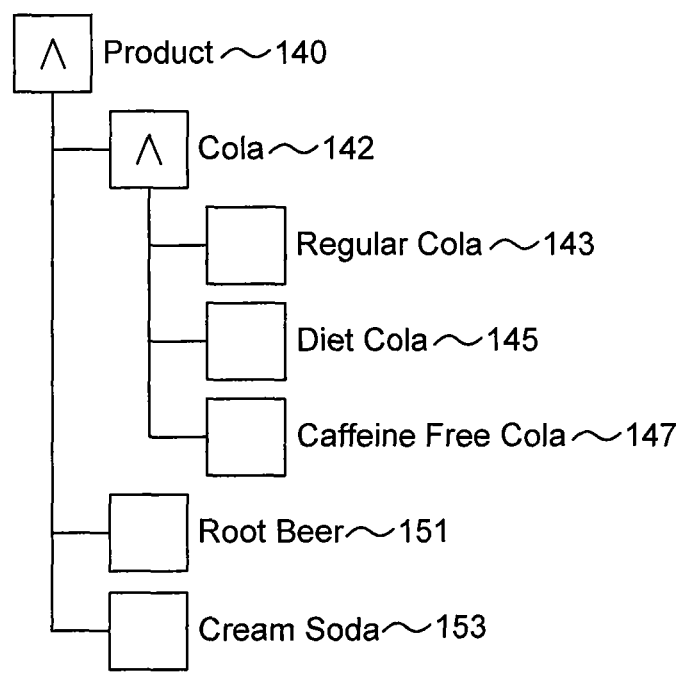
FIG. 1C illustrates an example of a hierarchy outline representing a product dimension of a multidimensional database.

FIG. 1C Shows an example of a hierarchy of the product dimension 140. In the hierarchy shown in FIG. 1C, parent member Cola 142 has three child members: Regular Cola 143, Diet Cola 145, Caffeine Fee Cola 147. Regular Cola 143, Diet Cola 145, Caffeine Fee Cola 147, Root Beer 151 and Cream Soda 153 are all leaf level members of the product dimension 140.

Figure 1D:
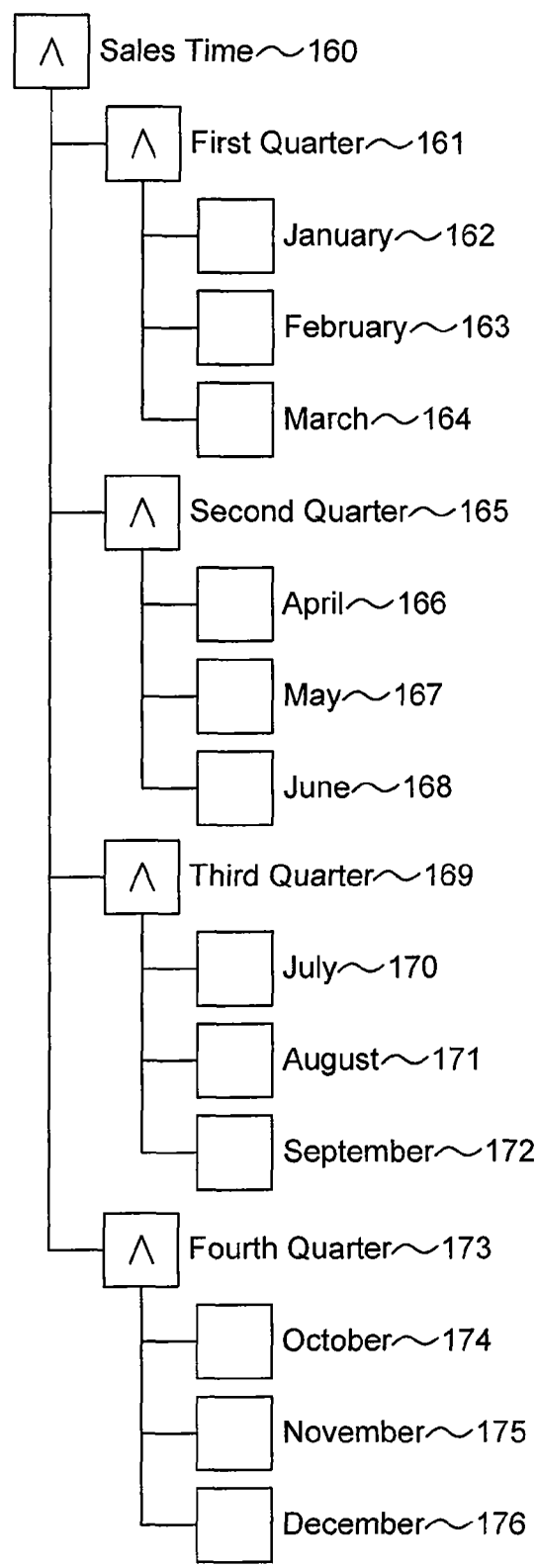
FIG. 1D illustrates an example of a hierarchy outline representing a sales time dimension of a multidimensional database.

FIG. 1D shows an example of a hierarchy of the sales time dimension 160 of the multidimensional database 100. The sales time dimension 160 has four members on the top level: First Quarter 161, Second Quarter 165, Third Quarter 169 and Fourth Quarter 173. First Quarter 161 has three child members: January 162, February and March 164. Similarly, members April 166, May 167 and June 168 are child members of Second Quarter 165; members July 170, August 171 and September 172 are child members of Third Quarter 169; members October 174, November 175 and December 176 are child members of Fourth Quarter 173. January 162, February, March 164, April 166, May 167, June 168, July 170, August 171, September 172, October 174, November 175 and December 176 are all leaf level members of the hierarchy of the sales time dimension 160.

Multidimensional databases are typically sparsely populated; that is, only a small fraction of all possible cells (intersection points) in a multidimensional database have data values. FIG. 2 illustrates an example of a dimension list of a multidimensional database. As illustrated in FIG. 2, the multidimensional database has 7 dimensions: Years, Scenario, Product, Legal Entity, Cost Center, Account and Period. Years dimension has 8 dimension members. Scenario dimension has 20 dimension members. Product dimension has 108 dimension members. Legal Entity has 149 dimension members. Cost Center has 2758 dimension members. Account has 512 dimension members. Period has 12 dimension members. The number of cells, i.e. the number of possible combinations of members of all dimensions, is 8*20*108*149*2758*512*12=43.6 trillion. However, the number of cells which actually have data values in the multidimensional database is 6,075,367. In other words, most of the cells in this multidimensional have no data values, i.e., they are empty cells.

To extract data from a multidimensional database, an extraction process specifies a subset of the database and executes an appropriate command to extract the data within the subset. Subsets of a multidimensional database are normally specified using one or more hierarchy branches identified by dimension members. For example, for the multidimensional database illustrated in FIGS. 1A-1D, a subset of the database can be specified as {Washington+New York City, Regular Cola, Second Quarter}, which means the data to be extracted are the sales figures of regular colas in second quarter from Washington state and New York City.

Given the data sparseness of multidimensional databases, the extraction process can spend significant time and efforts attempting to extract data from areas of the database where there is no data. This can result in added overhead and inefficient data extraction. Therefore, according to the techniques introduced here, an extraction process taking advantage of sparseness discovery allows data extraction of a subset of the database based on a hierarchy of members while reducing the overhead caused by extracting data from empty cells.

The sparseness discovery is based on the fact that data stored in multidimensional databases are aggregated. This means a data value from a cell located by a dimension member contributes to a data value of a cell that is located above the dimension member in the hierarchy, either as a parent member or an ancestor member of the dimension member. For example, as in the multidimensional database illustrated in FIGS. 1A-1D, the sales figure of regular colas in January in New York City also contribute as a part of the sales figure of regular colas in January in New York State (also in the East region). On the other hand, if no regular colas were sold in January in markets of New York State, New York City, Albany, Massachusetts, or Boston then there will be no sales figure of regular colas in January in the East region.

Figure 4:
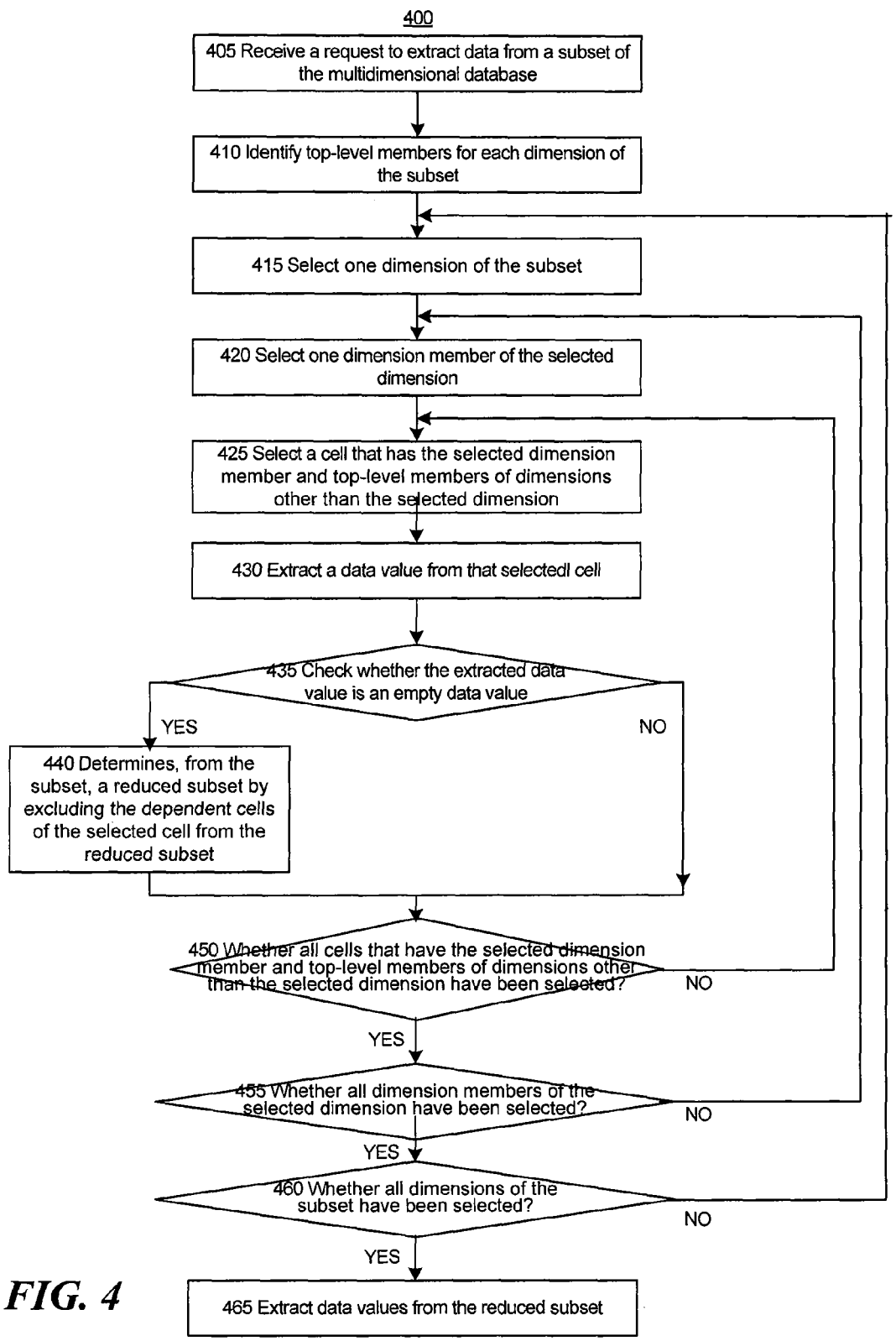
FIG. 4 illustrates an example of a data extraction process for extracting data from a multidimensional database using the sparseness discovery techniques.

FIG. 4 illustrates the data extraction process 400 for extracting data from a multidimensional database using the sparseness discovery (SD) techniques. At step 405, SD receives a request to extract data from a subset of the multidimensional database. The subset is defined by a plurality of dimension members.

At step 410, SD identifies one or more top-level members for each dimension of the subset.

Then at step 415, SD selects one dimension of the subset. At step 420, SD selects one dimension member among all dimension members of the selected dimension within the subset.

At step 425, SD selects one or more cells located by the selected dimension member and all top-level members of dimensions other than the selected dimension.

At step 430, SD extracts data values from the selected cells. At step 435, SD determines whether the extracted data values all are empty data values. An empty data value means that the multidimensional database stores no data at that selected cell. If all the extracted data values are empty data values, at step 440, SD removes the selected dimension member from the reduced subset.

At step 450, the DBMS checks whether all cells that have the selected dimension member and top-level members of dimensions other than the selected dimension have been selected. If not all cells that have the selected dimension member and top-level members of dimensions other than the selected dimension have been selected, SD goes back to step 425 to select another cell. Otherwise, SD continues to step 455.

At step 455, SD checks whether all dimension members of the selected dimension have been selected. If not all of these dimension members have been selected, SD goes back to step 420 to select another dimension member of the selected dimension. Otherwise, SD continues to step 460.

At step 460SD checks whether all dimensions of the subset have been selected. If not all of the dimensions have been selected, SD goes to step 415 to select another dimension of the subset. Otherwise, SD continues to step 465. At step 465, SD extracts data values from the multidimensional database using the reduced subset As an example, the data extraction process 400 as illustrated in FIG. 4 can apply to the multidimensional database 100 as illustrated in FIG. 1A with the hierarchy shown in FIGS. 1B, 1C, and 1D. Assuming the subset of the database to be extracted is specified as "Annual, quarterly, and monthly sales figures for regular cola in the East market", which means the subset of the data to be extracted are the intersections of all members of the Sales Time dimension, the East, New York, New York City, Albany, Massachusetts, and Boston members of the Market dimension, and the Regular Cola member of the Product dimension. Assuming also that the product Regular Cola only sold in Boston in April and May and in no other place in the East market during the entire year. As summarized in FIG. 3, the subset of the Market dimension of the multidimensional database 100 has totally 6 members. The subset of the Product dimension 140 has 1 member. The subset of the Sales time dimension has totally 17 members. In this example, SD receives a request to extract data from the subset defined above. A data extraction process without SD would extract data from 6*1*17=102 cells in the database 100.

According to the data extraction process 400, SD first identifies the top-level dimension members. In this example there is only one top-level member for each dimension of the selected subset. Then SD selects one dimension of the subset, Market. There are 6 dimension members of the subset for dimension Market. For the other dimensions (i.e. Product and Sales Time), there are 1*1=1 combination of top-level members. The process 400 extracts 6*1*1=6 cells that have a dimension member of Market and top-level members of other dimensions. Only the Market members Boston, Mass., and East in combination with the top level members Regular Cola and Sales Time yield any data so the members New York, New York City, and Albany are removed from the subset.

Then SD selects another dimension of the subset, Product. There is only one dimension member for dimension Product. SD extracts data from the cell (East, Regular Cola, Sales Time) which is the combination of the selected Product dimension member and the top-level members of the other dimensions. That cell has data so SD moves on.

Again SD selects the last dimension of the subset, Sales Time. There are totally 17 dimension members selected for dimension Sales Time. For the other dimensions (i.e. Market and Product), there are 1*1=1 combination of top-level members. The process 400 extracts 1*1*17 cells that have a dimension member of Sales Time and top-level members of other dimensions. Only the Sales Time members Sales Time, Second Quarter, April and May in combination with the top level members East and Regular Cola yield any data so the members First Quarter, January, February, March, June, Third Quarter, July, August, September, Fourth Quarter, October, November, December are removed from the subset. The subset has been reduced to East, Massachusetts, Boston for the Market dimension, Regular Cola for the Product dimension, and Sales Time, Second Quarter, April, May for the Sales Time dimension. The subset went from being the combination of 6*1*17=102 members to the combination of 3*1*4=12 members. SD will then perform an extraction of data from the reduced subset of the multidimensional database. In conclusion, to extract data from the subset without SD would require extracting data from 6*1*17=102 cells. With SD it requires extracting data from 6*1*1+1*1*1+ 1*1*17=24 cells to perform the sparse discovery and 3*1*4=cells to do the actual data extraction for a total of 36 cells.

In some situations, only leaf level members of dimensions are requested for extraction. In other words, the subset to be extracted only includes cells located by leaf level members. In these cases, the leaf level members are also the top-level members, and the sparseness discovery will not be able to reduce the subset to be extracted based on the these top-level members. In one embodiment, in order to reduce the number of top-level members and to optimize the data extraction, the extraction process can include new common top-level members that are not originally included in the extraction request. In other words, high-level cells located by the new common top-level members are added into subset of data extraction. These new common top-level member are selected so that the leaf level cells roll up into the added high-level cells. Then the extraction process conducts sparseness discovery as disclosed in previous paragraphs to remove empty cells located at the leaf level members. This mechanism is referred to as level zero optimization.

Figure 5:
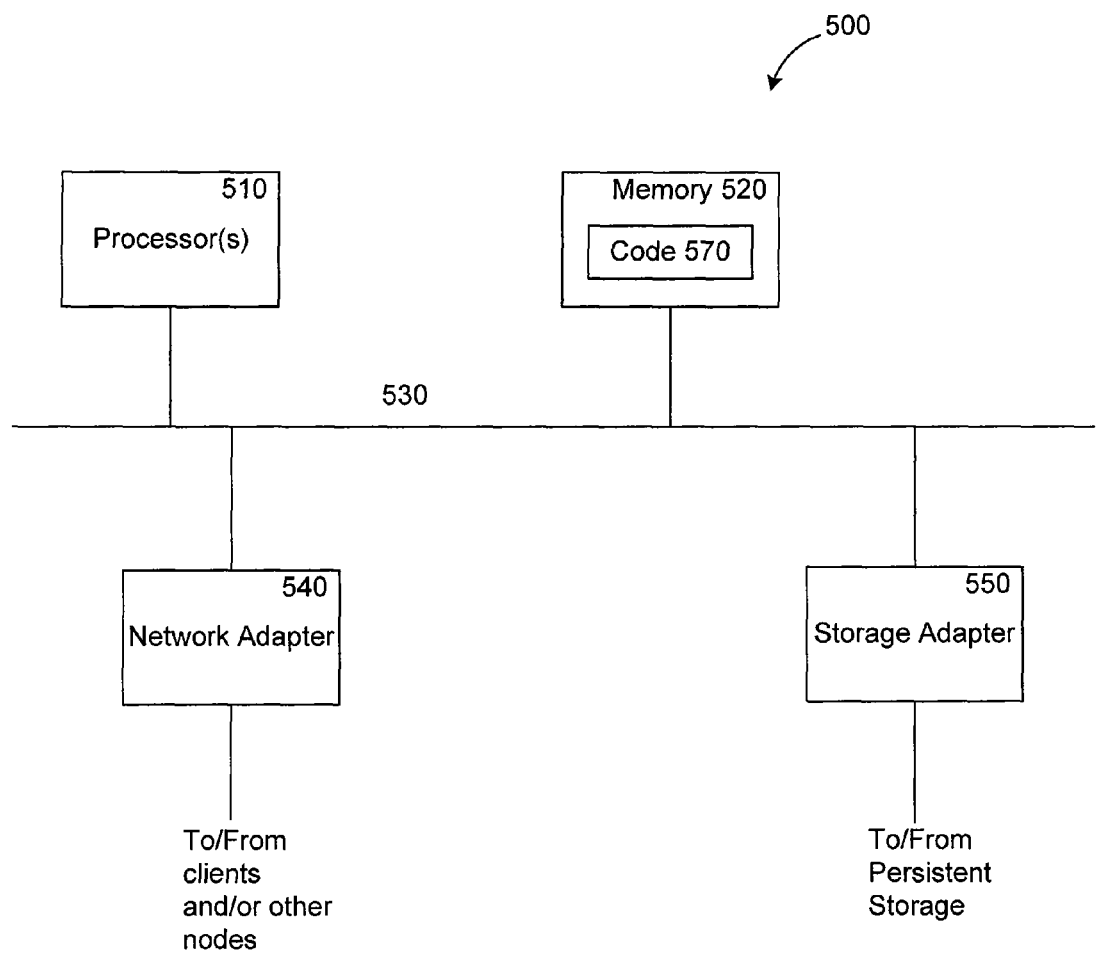
FIG. 5 is a high-level block diagram showing an example of the architecture of a computer server, which may represent any computer running the database management system described herein.

FIG. 5 is a high-level block diagram showing an example of the architecture of a computer server, which may represent any computer running the database management system described herein. The server 500 includes one or more processors 510 and memory 520 coupled to an interconnect 530. The interconnect 530 shown in FIG. 5 is an abstraction that represents any one or more separate physical buses, point to point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 510 is/are the central processing unit (CPU) of the server 500 and, thus, control the overall operation of the server 500. In certain embodiments, the processor(s) 510 accomplish this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 520 is or includes the main memory of the server 500. The memory 520 represents any form of random access memory (RAM), read-only memory (ROM), flash memory, or the like, or a combination of such devices. In use, the memory 520 may contain a code 570 containing instructions according to the techniques disclosed herein.

Also connected to the processor(s) 510 through the interconnect 530 are a network adapter 540 and a storage adapter 550. The network adapter 540 provides the server 500 with the ability to communicate with remote devices, over a network and may be, for example, an Ethernet adapter or Fibre Channel adapter. The network adapter 540 may also provide the server 500 with the ability to communicate with other computers. The storage adapter 550 allows the server 500 to access a persistent storage, and may be, for example, a Fibre Channel adapter or SCSI adapter.

The code 570 stored in memory 520 may be implemented as software and/or firmware to program the processor(s) 510 to carry out actions described above. In certain embodiments, such software or firmware may be initially provided to the server 500 by downloading it from a remote system through the server 500 (e.g., via network adapter 540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A database management system, comprising:
   at least one processor; and
   a machine-readable storage medium storing instructions that, when executed, cause the at least one processor to:
   receive a request to extract data from a subset of a multidimensional database that stores data at a plurality of cells, wherein the subset is defined as having a plurality of dimension members;
   identify, in a first dimension of the multidimensional database, a top-level member from the plurality of dimension members, wherein the top-level member is included in the first dimension of the multidimensional database and has no ancestor member from the subset;
   select, in the first dimension of the multidimensional database, a dimension member within the subset;
   extract at least one data value from at least one cell located by the dimension member and a group of top-level members of dimensions other than the first dimension of the multidimensional database, wherein values of the group of top-level members do not roll up into a value of any ancestor member from the plurality of dimension members;
   responsive to determining that the at least one data value is an empty data value, determine, from the subset, a reduced subset by excluding respective dependent cells of the at least one cell from the reduced subset, wherein each of the respective dependent cells of the at least one cell has the dimension member of the first dimension and descendent members of the group of top-level members of dimensions other than the first dimension; and
   satisfy the request by extracting data values from only the reduced subset and without extracting data values from the excluded dependent cells.

2. The database management system of claim 1, wherein the top-level member of the first dimension is a root dimension member of the first dimension.

3. The database management system of claim 1, wherein each data value of the dependent cells of the at least one cell contributes to at least a portion of the at least one data value of the at least one cell.

4. The database management system of claim 1, wherein the subset is defined by only a plurality of leaf level dimension members, and wherein the machine-readable storage medium further stores instructions that, when executed, cause the at least one processor to:
   add new cells from the multidimensional database into the subset, wherein each of the new cells is located by an ancestor member of a leaf level dimension member of the plurality of leaf level dimension members.

5. The database management system of claim 4, wherein the subset includes a plurality of leaf level cells that are located by the plurality of leaf level dimension members, wherein each of the leaf level cells is a dependent cell of one of the new cells, wherein a data value from each of the leaf level cells contributes to a data value from one of the new cells.

6. A database management system, comprising:
   at least one processor; and
   a machine-readable storage medium storing instructions that, when executed, cause the at least one processor to:
   receive a request to extract data from a subset of a multidimensional database that stores data at a plurality of cells, wherein the subset is defined by a plurality of dimension members, each dimension member of the plurality of dimension members belongs to a dimension of a plurality of dimensions of the multidimensional database;
   identify top-level members from the plurality of dimension members, wherein the top-level members have no ancestor member from the subset;
   select a first dimension from the plurality of dimensions, a dimension member of the selected dimension, and at least one cell of the subset that has the selected dimension member and top-level members of dimensions other than the selected dimension, wherein values of the top-level members do not roll up into a value of any ancestor member from the plurality of dimension members;
   extract at least one data value from the at least one selected cell;
   responsive to determining that the at least one selected cell has no data value, determine, from the subset, a reduced subset by excluding respective dependent cells of the at least one selected cell from the reduced subset, wherein each of the respective dependent cells of the at least one selected cell has the selected dimension member and descendent members of the top-level members of dimensions other than the selected dimension; and
   satisfy the request by extracting data values from the reduced subset without extracting data values from the excluded dependent cells.

7. The database management system of claim 6, wherein the machine-readable storage medium further stores instructions that, when executed, cause the at least one processor to:
   repeat the extracting and determining the reduced subset for all cells of the subset that have the selected dimension member and top-level members of dimensions other than the selected dimension.

8. The database management system of claim 6, wherein the machine-readable storage medium further stores instructions that, when executed, cause the at least one processor to:
   repeat the extracting and determining the reduced subset for all dimension members of the selected dimension and all cells of the subset that have the dimension members of the selected dimension and top-level members of dimensions other than the selected dimension.

9. The database management system of claim 6, wherein the machine-readable storage medium further stores instructions that, when executed, cause the at least one processor to:
   repeat the extracting and determining the reduced subset for all cells of the subset that have at least N−1 top-level members, wherein N is a total number of dimensions of the multidimensional database.

10. A non-transitory machine-readable storage medium storing instructions that, when executed, cause at least one processor to:
   receive a request to extract data from a subset of a multidimensional database that stores data at a plurality of cells, wherein the subset has a plurality of dimension members, and each dimension member of the plurality of dimension members belongs to a dimension of a plurality of dimensions of the multidimensional database;

determine, from the subset, a reduced subset by excluding a plurality of empty cells from the subset, wherein determining the reduced subset comprises:
  identifying all top-level members from a plurality of dimension members that define the subset, wherein values of the top-level members do not roll up into a value of any ancestor member from the plurality of dimension members;
  extracting at least one data value from at least one high-level cell located by at least one of the top-level members and a group of dimension members from the plurality of dimension members; and
  responsive to determining that the at least one data value is an empty data value, determining, from the subset, a reduced subset by excluding roll-up cells of the at least one high-level cell from the reduced subset, wherein each of the roll-up cells is located by a descendent member of the at least one of the top-level members and the group of dimension members; and
satisfy the request by extracting data values from only the reduced subset and without extracting data values from the excluded roll-up cells.

11. The non-transitory machine-readable storage medium of claim 10, wherein the plurality of empty cells includes dependent cells of the at least one high-level cell, each of the high-level cells has at least N−1 top-level members, and N is a total number of dimensions of the multidimensional database.

12. The non-transitory machine-readable storage medium of claim 11, wherein each data value of the dependent cells of the high-level cells contributes to at least a portion of a data value of a corresponding high-level cell.

13. The non-transitory machine-readable storage medium of claim 10, wherein the subset only includes leaf level cells, and the leaf level cells are located by leaf level dimension members.

14. The non-transitory machine-readable storage medium of claim 13, further storing instructions that, when executed, cause the at least one processor to:
  adding new cells into the subset, wherein each of the new cells is located by a dimension member that is not a leaf level dimension member, wherein each of the leaf level cells is a dependent cell of one of the new cells, wherein a data value from each of the leaf level cells contributes to a data value from one of the new cells.

15. The non-transitory machine-readable storage medium of claim 13, wherein the leaf level cells include at least one empty cell, and the empty cell has no data value stored in the empty cell.

16. The non-transitory machine-readable storage medium of claim 10, wherein one of the roll-up cells is located by a leaf level dimension member having leaf-level cells.

17. The non-transitory machine-readable storage medium of claim 16, further storing instructions that, when executed, cause the at least one processor to:
  determining middle-level cells outside the subset, wherein each of the leaf-level cells is a roll-up cell of the middle-level cells, and data values from the roll-up cells contribute to data values of the middle-level cells; and
  for each individual middle-level cell of the middle-level cells,
    extracting a respective data value from that individual middle-level cell, and
    if that individual middle-level cell has no data value, determining, from the subset, a reduced subset by excluding roll-up cells of that individual middle-level cell from the reduced subset, wherein a respective data value from each of the roll-up cells of that individual middle-level cell contributes to the respective data value from that individual middle-level cell.

* * * * *